| United States Patent [19] | [11] 3,878,231 |
|---|---|
| Harwood | [45] Apr. 15, 1975 |

[54] ACYLATION OF SYMMETRICAL DIGLYCERIDES WITH FATTY ACID ANHYDRIDE

[75] Inventor: James Harwood, Tulsa, Okla.

[73] Assignee: SCM Corporation, Cleveland, Ohio

[22] Filed: Nov. 12, 1973

[21] Appl. No.: 414,679

Related U.S. Application Data

[63] Continuation-in-part of Ser. No. 171,020, Aug. 11, 1971.

[52] U.S. Cl. ............. 260/410.7; 426/362; 426/192; 426/173
[51] Int. Cl. ........................... C11c 3/00; A23d 5/00
[58] Field of Search ................................... 260/410.7

[56] References Cited
UNITED STATES PATENTS
3,410,881  11/1968  Martin et al. .................... 260/404.8
3,689,514  9/1972  Neissner et al. .................. 260/410.8

OTHER PUBLICATIONS
Strelets et al. Chemical Abstracts, Vol. 72, 56991c (1970).

*Primary Examiner*—Donald G. Daus
*Assistant Examiner*—D. G. Rivers
*Attorney, Agent, or Firm*—Thomas M. Schmitz

[57] ABSTRACT

Stereospecific triglycerides are prepared by a solvent-free acylation of symmetrical diglycerides. Acylation of the free hydroxyl group on the symmetrical diglyceride is accomplished by heating the diglyceride in the presence of a high aliphatic fatty acid anhydride at a temperature slightly above the melting point temperature of the mixture to form liquid phase reactants. Acylation takes place by maintaining a liquid phase reaction and converting the symmetrical diglyceride to stereospecific triglyceride.

2 Claims, No Drawings

ACYLATION OF SYMMETRICAL DIGLYCERIDES WITH FATTY ACID ANHYDRIDE

BACKGROUND OF THE INVENTION

This application is a continuation-in-part of the copending application of James Harwood, Ser. No. 171,020, filed Aug. 11, 1971, and the same is incorporated herein by reference.

This invention pertains to a process for synthesizing stereospecific triglycerides suitable for use as hard butters which are particularly useful in confectioners products. Synthetic hard butters are often used in conjunction with cocoa butter or as a substitute for cocoa butter. Hard butters have definitive physical properties such as a very short temperature range wherein softening is effected. Cocoa butter, for example, is a brittle solid at 77°F, melts at a relatively narrow range, and is completely fluid at 95°F. The demand for cocoa butter and other saturated-unsaturated-saturated stereospecific triglycerides has prompted several attempts to synthesize stereospecific triglycerides. The synthesis of stereospecific triglycerides has encountered difficulties in the past primarily due to esterification procedures which cause substantial ester group rearrangement of the glyceride starting materials whereby random triglycerides result rather than desirable stereospecific triglycerides. Upon heating, rearrangement occurs as well as ester interchange. *The J. American Oil Chemist Society*, Vol. 4 (1963), page 260, discloses that esterification of symmetrical diglycerides with a fatty acid in the presence of stannous chloride and p-toluensulfuric acid resulted in mixed triglyceride products. *J. Lipid Research*, Vol. 3 (1962) discloses that 1,3-diglycerides isomerize upon heating into an 80/20 to 60/40 mixture of 1,3- and 1,3-diglycerides wherein the isomerization increases rapidly in the presence of an acid or basic catalyst.

Several methods for producing stereospecific triglycerides have been proposed. Harwood suggests reacting fatty acyl chloride with a symmetrical diglyceride in U.S. Pat. No. 3,634,473 wherein the reaction takes place in a solvent and a hydrogen chloride acceptor is used. A patent issued to Martin et al. (U.S. Pat. No. 3,410,881) discloses a stereospecific 1,3 diglyceride reacted with a molar excess of oleic anhydride in the presence of perchloric acid catalyst to produce synthetic cocoa butter.

Accordingly, it is a primary object of this invention to provide a solvent-free process for efficiently preparing stereospecific triglycerides from symmetrical diglycerides.

A further object of this invention is to provide a process for efficiently acylating symmetrical diglycerides without the necessity of purifying the stereospecific triglyceride by first removing solvents, catalysts, or chlorine byproducts.

These and other advantages will become more apparent by referring to the Detailed Description of the Invention.

SUMMARY OF THE INVENTION

Briefly, the invention pertains to a solvent-free process for acylating symmetrical diglycerides and converting the same to stereospecific triglycerides by melting a mixture of the diglycerides with a molar excess of fatty acid anhydride and heating the same in an inert atmosphere to form a liquid phase reaction, and acylating the diglyceride in a liquid phase reaction at temperatures above the melting point of the mixture, but at temperatures below the decomposition temperature of the symmetrical diglyceride, until essentially complete acylation of the symmetrical diglyceride is effected to form a stereospecific triglyceride.

DETAILED DESCRIPTION OF THE INVENTION

Symmetrical diglycerides are known to be somewhat unstable upon heating wherein typically a 1,3 diglyceride quickly isomerizes into at least about an 80/20 mixture of 1,3 diglyceride and 1,2 diglyceride among minor amounts of other ester rearrangements. However, mixing of the symmetrical 1,3 diglyceride with a fatty anhydride prior to heating surprisingly suppresses isomerization and under controlled liquid phase reaction conditions yields a stereospecific triglyceride rather than a random mixture of triglycerides which normally may be expected.

The higher fatty anhydride and the symmetrical diglyceride are charged into a reaction vessel at about room temperature. The charged components are in solid form and thereafter heated up to the melting point of the component mixture which usually is at least about 65°C. Moderate heat is maintained until the components liquefy and liquid phase conditions are reached. A reactant mixture of 1,3-distearin and oleic anhydride, for example, requires temperatures of about 70°C to obtain a liquid phase mixture.

After obtaining a liquid phase mixture of symmetrical diglyceride and fatty anhydride, the reaction temperature preferably maintained slightly above the melting temperature for at least about one hour and preferably at least about 2 hours. Thereafter the reaction temperature can be moderately raised to carry out the acylation reaction and thereby produce a stereospecific triglyceride. Acylation temperatures are at least 65°C and preferably at least about 80°C and up to about 220°C whereby complete acylation can take place in about 1 to 3 hours. The time required for complete acylation depends on the temperature wherein higher temperatures usually result in a shorter acylation time. Acylation at relatively low temperatures of about 70°C may take up to about 4 hours, whereas acylation at about 190°C can take only 1 hour. Temperatures above about 200°C and particularly above 230°C should be avoided since isomerization may occur as well as discoloration of the triglyceride product may occur. A 1,3-distearin acylated with oleic anhydride, for example, can be melted and heated at 70°F for about 1 hour and thereafter acylation advantageously proceeds efficiently at a reaction temperature of about 170°C.

As noted above, discoloration may occur due to excessive acylation temperatures. Symmetrical diglycerides having unsaturated fatty acid radical, or fatty anhydrides containing unsaturated fatty acid radicals, are often susceptible to discoloration due to destruction or oxidation of the unsaturated unit in the fatty acid chain. Accordingly, acylation even at moderate acylation temperatures preferably is accomplished by an inert atmosphere within the reaction vessel. Typical useful inert gases include, for example, nitrogen, helium, carbon dioxide, argon, and the like.

After the symmetrical diglyceride is acylated to the extent desired, the stereospecific triglyceride product is desirably steam distilled or deodorized under vacuum to remove residual odors and/or tastes and free fatty acids from the triglyceride product as well as removing any excess low molecular weight $C_{12}$ to $C_{14}$ fatty anhydride. High molecular weight $C_{16}$ to $C_{20}$ fatty anhydrides can be removed by esterifying the same with a low molecular weight alcohol such as isopropanol and thereafter removing the isopropyl esters by deodorization.

Symmetrical diglycerides are symmetrical glycerol esters comprising 1,3 diglyceride wherein the ester radicals are acyl groups containing between 12 to 22 carbon atoms, and preferably 16 to 18 carbon atoms. Symmetrical diglycerides are intended to refer to 1,3 diglycerides wherein positional symmetry exists rather than refer to the type of acyl radical. A particularly useful symmetrical diglyceride, for example, is a 1-stearoyl-3-palmetoyl-diglyceride (3-palmeto-1-stearin). Particularly preferred symmetrical diglycerides are 1,3 diglycerides containing saturated acyl groups such as palmetoyl and/or stearoyl radicals which are particularly suitable for acylation in accordance with this invention to produce saturated-unsaturated-saturated (S-U-S) triglycerides. It is well known that S-U-S triglycerides are compatible with cocoa butter and thus particularly desirable for use in confectioner compositions.

A suitable process for making symmetrical diglycerides is disclosed in Harwood, U.S. Pat. No. 3,634,473, wherein precipitation of solid symmetrical diglyceride is induced by cooling a catalyzed liquid mixture of random triglycerides and glycerol. The disclosure of said Harwood patent is incorporated herein by reference. Harwood U.S. Pat. No. 3,312,724 further discloses a suitable method for preparing symmetrical diglycerides.

The symmetrical diglyceride is reacted with a fatty acid anhydride (fatty anhydride) to produce a stereospecific triglyceride. The fatty acid portion of useful fatty anhydrides preferably is a higher fatty acid radical containing 10 to 22 carbon atoms, and most preferably 16 to 18 carbon atoms. Useful higher fatty anhydrides, for example, may be derived from fatty acids such as lauric, stearic, palmitic, behenic, oleic, linoleic, capric, myristic, or linolenic. For reasons of efficiency and economy, oleic, stearic, lauric, and palmitic fatty anhydrides are preferred in acylating symmetrical diglycerides. In S-U-S hard butters, the fatty anhydride is oleic whereby the most preferred hard butter is a S-U-S stereospecific triglyceride of stearic and/or palmitic as the saturated fatty acid radical and oleic as the unsaturated fatty acid radical.

Fatty anhydrides can be produced by conventionally refluxing a higher fatty acid with acetic anhydride whereby a fatty anhydride is produced along with an acetic acid byproduct. The acetic acid byproduct can be removed by fractional distillation thereby leaving the fatty anhydride remaining in the distillation vessel.

The proportions of symmetrical diglyceride acylated with fatty anhydride must be at least stoichiometric wherein one mole of fatty anhydride acylates one mole of diglyceride. Preferably, a molar excess of fatty anhydride is used. In the acylation process, one mole of fatty anhydride acylates one mole of diglyceride wherein one fatty acid portion of the fatty anhydride esterifies the free hydroxyl group on the diglyceride; whereas the other fatty acid radical of the fatty anhydride forms a fatty acid byproduct. Thus, in calculating stoichiometric requirements, at least one mole of fatty anhydride is required to acylate one free hydroxyl on one mole of diglyceride rather than a one-half mole of diglyceride. An excess molar weight of fatty anhydride is preferred to obtain complete acylation of the symmetrical diglyceride to stereospecific triglyceride. Although large excesses of fatty acid are not necessarily detrimental, large excessive amounts of fatty anhydride undesirably affect the economics of the process. Typically, molar excesses up to about 2 moles of fatty anhydride per one mole of symmetrical diglyceride have been found to be efficient and insure complete acylation of the symmetrical alcohol.

The following examples are not intended to be limiting but rather to illustrate the preferred embodiments of this invention. All parts are by weight and all percentages are weight percentages.

EXAMPLE 1

1,3-distearin was prepared in accordance with the method set forth in Example 2 of Harwood Patent U.S. 3,312,724. A reactor was charged with 100 grams of tristearin, completely hydrogenated soybean oil, and 52 grams of anhydrous glycerol which was heated to 105°–110°C with stirring for 2 hours under $N_2$ blanket. Sodium methoxide (5 grams) was added and vigorously stirred into the reactant mixture for two more hours while maintaining heat. Thereafter, the temperature of the equilibrated glyceride mixture was diminished to about 80°C whereupon 1 liter of anhydrous tetrahydrofuran was added. The reactant was adjusted to about 55°C, pressure in the system was reduced, and refluxing occurred. Solvent was then withdrawn at a rate of about 150 ml. per hour for about 7 hours. The crude product analyzed to be about 87.6% 1,3-distearin. The product was recrystallized from a mixture of isopropyl alcohol and petroleum ether yielding 1,3-distearin.

EXAMPLE 2

Oleic acid anhydride is prepared by charging 2 moles of oleic acid and one mole of acetic anhydride to a vessel containing a fractionation column. The contents are heated to reflux temperature thereby establishing liquid phase conditions and acetic acid byproduct is removed through the fractionation column. Essentially, no acetic acid is present in the residue of oleic anhydride.

EXAMPLE 3

Ten parts of glycerol distearin of Example 1 wherein about 96% is the 1,3-isomer were charged at room temperature to a vessel and ten parts of the oleic acid anhydride of Example 2 and heated to slightly above the melting temperature of the mixture (about 70°C). Nitrogen gas is injected into the vessel, thereby creating an inert atmosphere in the reaction vessel. Then the liquid mixture is heated to a temperature of about 170°C for about 2 hours followed by holding at 100°C for about 1 hour whereby complete acylation of the 1,3-glycerol distearin occurs. After reaction, isopropanol is added to the vessel to convert excess fatty acid anhydride to fatty acid and isopropyl ester. The ester can be removed while deodorizing by steam stripping at a temperature of about 220°C and 0.2 millimeters mercury for about one hour. Analysis by thin layer chromatography on a silver nitrate plate shows the product to contain essentially 1,3-glycerol distearin-2-oleate.

EXAMPLE 4

Lauric acid anhydride is prepared by charging 100 parts of lauric acid and 50 parts acetic acid anhydride to a vessel equipped with a fractionation column. The contents are heated to the boiling point and the acetic acid byproduct removed as a first cut from the fractionation column. Lauric acid anhydride distills over at about 180°C at 0.3 mm mercury and recovered. No further purification of the lauric acid anhydride is required, as most of the acetic acid anhydride is removed.

EXAMPLE 5

Ten weight parts of the lauric anhydride prepared in Example 4 and 10 weight parts of 1,3-glycerol distearin of Example 1 were then charged to the reactor vessel. Under an inert atmosphere, the temperature of the reactants was raised to about 70°C and held for about 1 hour until the reactants formed a liquid phase. The liquid mixture was then heated for about 2 hours under continued inert gas blanket at 70°C, and then increased up to about 220°C whereby acylation of the 1,3 diglyceride proceeded and was substantially completed in 1 hour. Thereafter, about 3 weight parts of isopropanol were added to the reaction vessel and excess fatty anhydride was removed in the manner set forth in Example 3. A Pancreate enzyme analysis indicated the triglyceride product contained substantially 1,3-distearin-2-laurate.

EXAMPLE 6

Ten parts of solid 1,3-distearin were melted at about 70°C to form a liquid. Thereafter, 10 parts of oleic anhydride were charged to the reaction vessel and agitated at a temperature of 80°C to form a liquid phase. Subsequent processing was similar to Example 3. The resulting product was not a stereospecific triglyceride but rather the product was a mixed triglyceride.

EXAMPLE 7

Ten weight parts of 1,3-dipalmitic produced in a manner similar to Example 1 is mixed at room temperature with eleven weight parts of oleic anhydride of Example 2. The reactants are heated under an inert blanket up to about 70°C and held for about an hour until a liquid phase mixture results. The mixture was processed similar to Example 3. The resulting product is 1,3-glycerol dipalmitate-2-oleate.

The foregoing examples indicate that stereospecific triglycerides can efficiently be produced in a solvent-free, non-catalytic liquid phase reaction wherein a symmetrical diglyceride forms a part of the liquid phase in the presence of a fatty anhydride. The foregoing examples are illustrative of this invention and may be varied by those skilled in the art but are not intended to limit the scope of this invention, as set forth in the appended claims.

I claim:

1. A solvent-free, non-catalytic acylating process for converting a symmetrical 1,3-diglyceride having a secondary hydroxyl into a stereospecific triglyceride, comprising:

providing a symmetrical 1,3-diglyceride having identical fatty acid radicals on the glyceride and selected from stearic fatty acid and palmitic fatty acid;

mixing prior to heating said symmetrical 1,3-diglyceride with a molar excess of fatty anhydride selected from stearic anhydride, palmitic anhydride, and oleic anhydride;

moderately heating said mixture at about 70°C to form a liquid phase reaction mixture;

heating said liquid mixture at temperatures between about 70°C and 200°C for time sufficient to substantially completely acylate said secondary hydroxyl with said fatty anhydride to form a stereospecific triglyceride.

2. The process of claim 1 wherein the liquid phase mixture is moderately heated for about 1 hour.

* * * * *